US009544531B2

(12) United States Patent
Angquist et al.

(10) Patent No.: US 9,544,531 B2
(45) Date of Patent: *Jan. 10, 2017

(54) MEDIA MAP FOR CAPTURE OF CONTENT FROM RANDOM ACCESS DEVICES

(71) Applicant: Apple Inc., Cupertino, CA (US)

(72) Inventors: Nils Angquist, San Francisco, CA (US); David R. Black, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 866 days.

This patent is subject to a terminal disclaimer.

(21) Appl. No.: 13/862,243

(22) Filed: Apr. 12, 2013

(65) Prior Publication Data

US 2013/0302012 A1 Nov. 14, 2013

Related U.S. Application Data

(63) Continuation of application No. 11/502,263, filed on Aug. 9, 2006, now abandoned.

(51) Int. Cl.
| | | |
|---|---|---|
| H04N 7/173 | (2011.01) | |
| G06F 3/00 | (2006.01) | |
| G06F 13/00 | (2006.01) | |
| H04N 5/445 | (2011.01) | |
| H04N 5/91 | (2006.01) | |
| G11B 27/034 | (2006.01) | |
| G11B 27/32 | (2006.01) | |
| H04N 21/84 | (2011.01) | |

(52) U.S. Cl.
CPC .............. *H04N 5/91* (2013.01); *G11B 27/034* (2013.01); *G11B 27/322* (2013.01); *H04N 21/84* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 6,070,228 A | 5/2000 | Belknap et al. | |
| 6,400,378 B1 | 6/2002 | Snook | |
| 6,496,980 B1* | 12/2002 | Tillman | H04N 7/17318 348/E7.071 |
| 6,847,778 B1* | 1/2005 | Vallone | G06F 3/04847 386/205 |
| 7,565,524 B2 | 7/2009 | Levy | |
| 8,413,184 B2* | 4/2013 | Angquist | G11B 27/034 348/207.1 |
| 2003/0093790 A1 | 5/2003 | Logan et al. | |
| 2003/0129228 A1* | 7/2003 | Kay | A61K 33/06 424/468 |
| 2003/0236906 A1* | 12/2003 | Klemets | H04N 5/76 709/231 |
| 2004/0061794 A1 | 4/2004 | Bodin | |
| 2004/0093360 A1 | 5/2004 | Hudson | |
| 2004/0141723 A1 | 7/2004 | Sakano | |
| 2004/0205286 A1 | 10/2004 | Bryant et al. | |

(Continued)

*Primary Examiner* — William J Kim
(74) *Attorney, Agent, or Firm* — Polsinelli LLP

(57) ABSTRACT

A method and apparatus for storing and displaying information about the capture and/or transfer of digital media is provided, wherein data is stored such that a visual representation indicating characteristics of video data, such as whether portions of the video data have been transferred to another device or captured to a storage device, may be generated and displayed.

17 Claims, 4 Drawing Sheets

(56) References Cited

U.S. PATENT DOCUMENTS

| | | |
|---|---|---|
| 2005/0114116 A1 | 5/2005 | Fiedler |
| 2005/0179692 A1 | 8/2005 | Kumagai et al. |
| 2006/0045470 A1* | 3/2006 | Poslinski ........... H04N 5/44513 386/297 |
| 2006/0150072 A1 | 7/2006 | Salvucci |
| 2006/0218365 A1 | 9/2006 | Osaki et al. |
| 2006/0226232 A1 | 10/2006 | Helkio et al. |
| 2007/0050379 A1 | 3/2007 | Day et al. |
| 2008/0192129 A1 | 8/2008 | Walker et al. |
| 2011/0231867 A1 | 9/2011 | Williams et al. |

* cited by examiner

| Name | Duration | In | Out |
|---|---|---|---|
| The Slogans Music Video 4/19/05 | | | |
| The Slogans Music Video 4/19/05 | 00:04:22:12 | Not Set | Not S |
| cam 1 guitar 1 | 00:04:21:41 | Not Set | Not S |
| cam 2 drums | 00:04:23:19 | Not Set | Not S |
| cam 3 lead | 00:04:27:11 | Not Set | Not S |
| cam 4 crowd 1 | 00:04:26:21 | Not Set | Not S |
| cam 5 stage right back | 00:04:21:18 | Not Set | Not S |
| cam 6 crowd 2 | 00:04:22:15 | Not Set | Not S |
| cam 7 guitar 2 | 00:04:24:19 | Not Set | Not S |
| cam 8 stage right front | 00:04:23:17 | Not Set | Not S |
| cam 9 stage angle | 00:04:24:21 | Not Set | Not S |
| intro clip 1 | 00:04:21:05 | Not Set | Not S |
| intor clip 2 | 00:04:23:04 | Not Set | Not S |
| intro clip 2b | 00:04:25:12 | Not Set | Not S |
| cam 5 stage right back [5]–Multiclip 3 | 00:04:23:10 | Not Set | Not S |
| outro clip 1 | 00:00:08:16 | Not Set | Not S |
| outro clip 2 | 00:00:09:04 | Not Set | Not S |
| outro clip 3 | 00:00:09:04 | Not Set | Not S |
| band shot | 00:00:09:13 | Not Set | Not S |
| band shot 2 | 00:00:09:21 | Not Set | Not S |
| in studio clip 1 | 00:00:10:05 | Not Set | Not S |
| in studio clip 2 | 00:00:10:14 | Not Set | Not S |
| lead solo clip | 00:00:10:18 | Not Set | Not S |
| backstage clip | 00:00:11:08 | Not Set | Not S |
| backstage clip 2 | 00:00:11:11 | Not Set | Not S |
| tour bus clip | 00:00:11:23 | Not Set | Not S |

MEDIA MAP FOR CAPTURE OF CONTENT FROM RANDOM ACCESS DEVICES

CROSS REFERENCE TO RELATED APPLICATIONS

This application is a continuation of U.S. patent application Ser. No. 11/502,263, filed Aug. 9, 2006, entitled "Media Map for Capture of Content from Random Access Devices," of which is hereby incorporated by reference herein.

FIELD OF THE INVENTION

The present invention relates to storing and displaying information about digital files, and more specifically, to techniques for identifying portions of digital files that have been transferred between a source and a destination.

BACKGROUND OF THE INVENTION

Video capture and production has evolved dramatically since the advent of movies and television. The introduction of magnetic tapes for recording, storage and playback of video was a dramatic advance, enabling a host of technologies such as the VCR that changed the way the world viewed entertainment.

The digital age has brought about changes in the video industry as well. Technologies such as digital tapes and DVDs allow video producers to store greater amounts of video data in a smaller physical space and in a durable format which, in theory, is immune to degradation over time. The ability to store greater amounts of video data is even more important now that high definition (HD) video is becoming more common. For example, a miniDV tape, depending on the type, currently can store up to approximately 70 gigabytes (GB) of video data, or about one hour of footage. A Blu-Ray digital video disk currently can store approximately 25 GB of video data. These advancing storage limits are propelling the acceptance of HD video, because HD video can take up four to five times the amount of room required for standard video.

New advances in random access devices such as solid state disks (SSD), an example of which is flash memory cards, are leading the way for video production to take another step forward. This application will discuss the use of flash memory, but it should be understood that the techniques described herein are not limited to any particular type of random access device, and any random-access device will suffice. The capacity of flash memory is growing at a high rate. While a 64 megabyte (MB) flash drive was standard just a few years ago, current high-end flash memory storage can approach approximately four GB. One such storage device is the P2 from Panasonic, which comprises several flash memory devices, configured in a Redundant Array of Independent Disks (RAID) Level 0, that act as one unit. While the storage capacity of random access devices, especially flash memory, does not yet equal that of standard magnetic tapes or digital video discs, a major advantage is that random access devices have virtually instantaneous access times.

The process of accessing video data from a tape is linear; that is, it proceeds in a straight line from start to finish. If one wishes to access video data stored in the middle of a tape, one must manually advance the tape to the spot marking the start of the desired data, begin processing the data in real time, and stop when the desired end is reached. With random access devices, a user can advance directly to the portion of the data to be accessed. Because access times are so fast, a user can appear to be accessing simultaneous streams of video data from the random access device because the accessing device can switch between accessing numerous portions of data stored on the random access device virtually instantaneously.

This generational shift in video media is especially pertinent in television media production. A current approach is to record hours of footage on video tapes, either analog or digital. The video data on these tapes is transferred to hard drives for use in computerized editing stations such as Apple's Final Cut Pro, Adobe Premiere, or a combination hardware and software solution such as Avid.

There are generally two different workflows for working with video data: an online, or full-resolution workflow, and an offline, or low-resolution workflow. The low-resolution workflow is often used because video producers have limited hard drive space and massive amounts of video footage. In the low-resolution workflow, the producers bring a low resolution version of the footage "offline." This involves transferring the video into a smaller footprint format and does not take as long as transferring the video at full resolution.

The low-resolution footage is then edited. The edits may involve reordering portions of footage, cutting between sections of footage, overlaying graphics, and similar tasks. Once the production tasks are finished using the low-resolution footage, the producers move to a full-resolution workflow, which involves moving to an "online" editing system that has much greater disk storage space. The video footage needed for the final version, that is, the footage that will constitute the final version, is recaptured at a higher resolution, often the native or full resolution.

After the video editing process is done, the original tapes are locked and never erased, because producers want to have the option of going back to recapture in high resolution the footage that was not captured before. The tapes also serve as a master copy.

A project file is generally a list of video files comprising a video project along with characteristics of the video files, such as start and end times of the video files within the project, filters applied to the video data within the files, transitions applied, and other aspects of the video files and the project itself. The project file is generally kept in hard drive storage because it is very small. If producers ever want to go back and recapture the footage in the project, they may use the project file to identify portions of video data needed to be recaptured and this data may be used to automatically recapture only the necessary portions of video data.

A drawback to the above approach, as it pertains to video captured on random access devices, is that random access devices are very expensive relative to tapes and other forms of storage media. Thus, it is cost-prohibitive to store video data on random access devices, and then store the random access devices in a library for possible future retrieval of the video data.

The inherent versatility of random access devices, namely their ability to be erased quickly and innumerable times, does not lend itself to long-term archival purposes. Rather, the inherent characteristics of random access devices make it ideal for reuse. For example, unlike tapes, there is no physical wear by reshooting on the same random access device over and over. As a result, producers want to shoot footage on random access devices, delete the footage after capturing it in higher-definition to long-term storage, and reuse the random access device for the next project.

This desire to erase footage in order to reuse the random access device causes problems if the erased footage had not been fully captured; for example, of the footage on a random access device, only a fraction may have been captured in full-definition to long-term storage, such as digital video tapes. If the footage is erased without storing it to long-term storage, and a future need arises for the non-captured full-definition footage, then there is nothing that can be done.

Therefore, a need exists for a technique that allows for the storing, accessing, identifying and displaying of information about the status of digital media files that may have been captured to storage devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
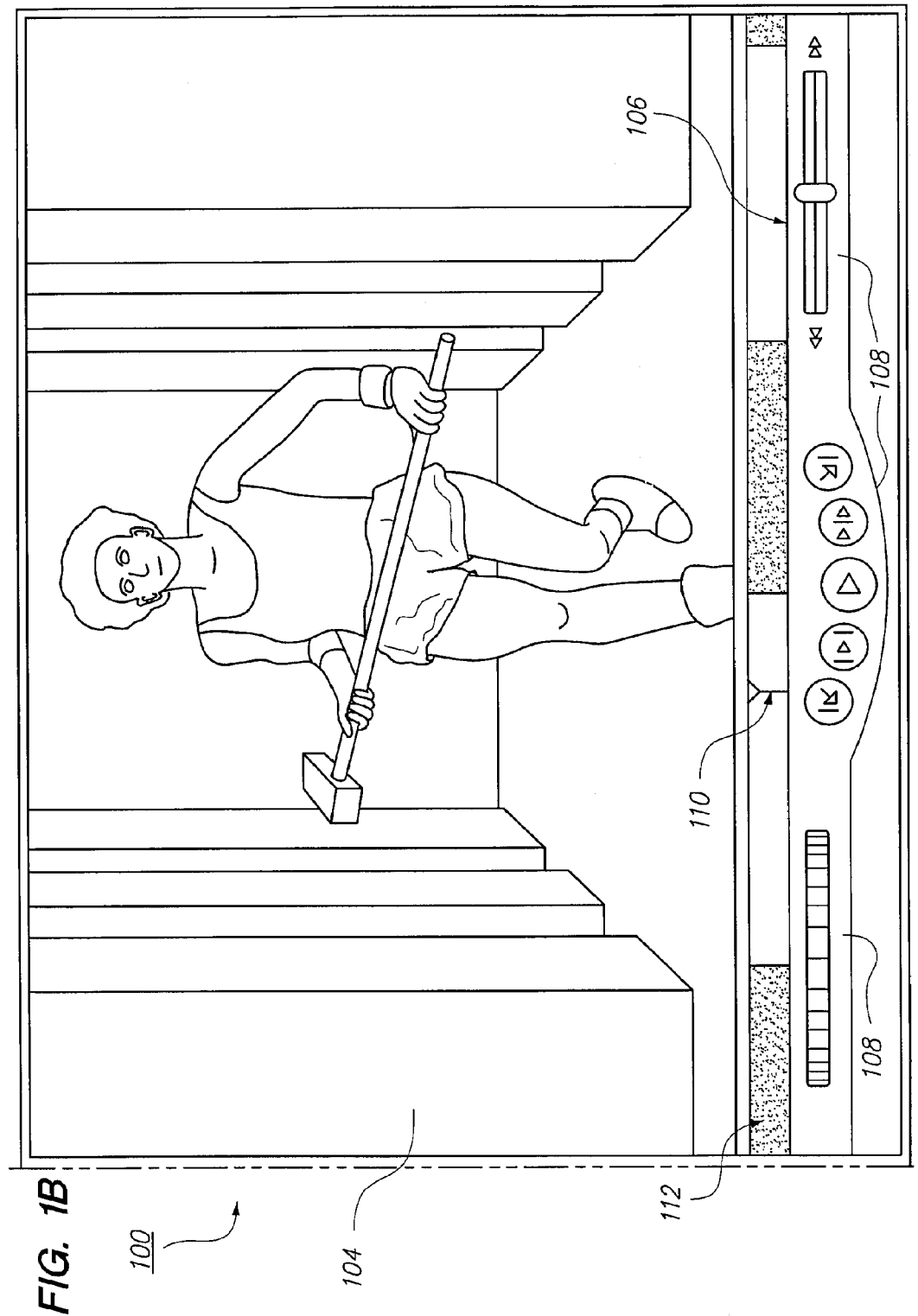
FIG. 1A is a block diagram illustrating an example of the invention wherein a media map is overlaid on a scrub bar.
FIG. 1B is a block diagram illustrating an example of the invention wherein a media map is overlaid on a scrub bar.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for storing and displaying information about the movement of digital media from a source to a destination, or between multiple peers. For example, a server may provide portions of digital media, such as audio and/or video media, to one or more clients. According to an embodiment, metadata associated with the digital media is stored on a device, such as a computer, describing which portions of the media have been provided to other devices, such as other computers. This may include an operation that results in the copy of the media to another device; for example, downloading the media to another device over a network. In response to providing the portions of media to another device, or copying the media to another device, the metadata on the providing device is automatically modified to indicate the transfer of the media and the state of the transfer of the media to the receiving devices. This "transfer state" of the media may indicate which portions of the media have been transferred, to which devices the portions have been transferred, the percentage of the whole portion that has been transferred, or any other characteristic associated with the transfer. The metadata may indicate which of a plurality of other devices have which portion of the media file or files. According to an embodiment, the techniques provide for keeping track at a server how much and which portions of a file have been downloaded to which clients. For example, video data may be stored at a central location and provided to various consumers. The described techniques allow for tracking the movement of the video data.

Techniques for performing these tasks may be implemented in a variety of contexts; for example, in the context of random access devices containing video data that is to be captured to separate devices. For example, techniques are described herein for allowing a user to easily and visually determine what portions of video data, stored on a random access device, have already been captured at a particular resolution to long-term storage. For example, certain portions of video data may have been captured at full, or native, resolution, while other portions may have been captured at less than full resolution. By knowing what portions of video data have already been captured at a particular resolution to long-term storage, a user knows which video data can be erased from the random access device without irreversible consequence; further, a user may determine which portions of the video data may need to be captured prior to reusing the random access device and at what resolution the capture needs to take place. Once a portion of the video data has been erased from the random access device, the memory that was occupied by the erased portion may be reused for a new project.

In one embodiment, "media map data" is a form of metadata used to track portions of video data that have been captured at a particular resolution to long-term storage. Media map data may be used to generate a media map. A "media map" is a visual representation that indicates which portions of video data have been captured at a particular resolution to long-term storage. This visual media map may itself be stored, in one example as a piece of metadata.

A video clip is a self-contained portion of video data. A video clip is made up of video data and a "video clip" is considered video data. In one embodiment, each video clip in a random access device is associated with media map data, and the media map data is stored on the same media as the video clip. For example, a flash memory card may store video clips and media map data that indicates which portions of the video clips have been captured to a storage device external to the flash memory card.

When such a random access device containing video clips is inserted into a computer system, software capable of reading and interpreting this media map data uses the media map data to display a media map. According to another embodiment, the media map may be read from a storage device and displayed. The media map data on a storage device is uniquely associated to the video clips on the storage device. Consequently, the media map data on a storage device is independent of any one computer system, and follows the storage device and the clips thereon. Thus, the media map data in a random access device will indicate all portions of video that have been captured from the random access device, even though different portions of that video data were captured at different times by several different computer systems. When a clip is erased, the corresponding media map data is erased.

A media map may be displayed in numerous variations; for example, a media map may be displayed behind a "scrub bar" of a video player. A "scrub bar" is a slider or "slidebar"

control to navigate forward and backward through video data. A scrub bar often will have a "playhead" indicator superimposed on the scrub bar to indicate the specific position in the video data being played, such as a specific frame. An example of these concepts is illustrated in FIG. 1. A media map may be visible in the scrub bar to indicate exactly which portions of the video clip have yet to be captured at full resolution. Colors and patterns may be used in a media map for visual emphasis. Another variation is a simplified media map in which the entire video clip is represented by a visual element such as a circle. The element will be filled with a color or pattern indicating the approximate percentage of the video clip that has been captured. For example, if approximately half of the video clip has been captured, the visual element will be half filled.

Media Map Display and Use

FIG. 1 illustrates an embodiment of the invention wherein a media map 112 is overlaid on a scrub bar 106.

According to one embodiment, a random access device containing portions of video data, herein referred to as "clips," is accessed by a program 100 capable of reading and interpreting the data that describes the media map information. A list of clips 102 stored on the random access device is displayed, along with information about the clips such as a title, duration, start point, end point, and other attributes.

A user may select one of the clips 102 and a low-resolution version of the video data comprising the clip may be displayed in a video player 104. It should be understood that multiple clips may also be selected, and the combined video data in the selected clips will be displayed in the video player 104 along with a media map that reflects which portions of each clip have been captured; however, for clarity in the description, only one clip will be considered to be selected and played at any one time. The video player 104 allows a user to play the video footage comprising the clip and identify which portions of the video data are to be captured to a hard drive. For example, a user may set a beginning and end point of footage to capture, and the video data between these points will be captured to another storage device as previously discussed. A user may set multiple beginning and end points to capture.

For clarity in the description, the term "capture" shall be used to indicate the transferring of video data, from a random access device such as flash memory, to storage media external to the random access device. Typically, video data is captured in a full-resolution format to long-term storage, such as a hard drive. However, other levels of resolution and storage are envisioned, and any mention of video data captured at full resolution should not be construed to exclude the possibility of capturing the data at a lower resolution.

One embodiment of the video player has a scrub bar 106 that graphically represents the entire duration of the selected clip or clips. A playhead 110 moves along the scrub bar 106 to indicate the current frame being played. The playhead 110 may also serve as an insertion point for additional footage or act as a tool for selecting beginning and end points to capture. The video player 104 may offer other controls 108 for manipulating the currently-playing clip.

In one embodiment, one variation of a media map 112 for a selected clip being played in the video player 104 is drawn behind, or superimposed on, the scrub bar 106. This allows the media map 112 visually to correspond to the duration of the clip and accurately correspond to the current position of the playhead 110. Therefore, the beginning of the media map 112 corresponds to the beginning of the currently-playing clip, the end of the media map 112 corresponds to the end of the currently-playing clip, and if the playhead 110 is at frame 747 of the currently-playing clip, then the portion of the media map 112 aligned with the playhead 110 reflects the status of frame 747 of the currently-playing clip. For purposes of this description, the playhead 110 is referred to as moving along the media map 112; however, the playhead 110 actually moves along the scrub bar 106. Other embodiments are envisioned where the scrub bar 106 and media map 112 are separately located, and a playhead 110 may appear on one or both and be separately manipulated.

In one embodiment, the media map 112 uses colors or gradients to visually indicate which portions of the clip have been captured. These individual, visually distinct areas of the media map corresponding to portions of video data may be considered sections of the media map. In the embodiment of FIG. 1, if the beginning of the clip corresponds to zero percent and the end corresponds to one hundred percent, approximately the first 25% of the media map 112 is gray, then a portion of white covers the next 25% of the media map 112, followed by another area of gray covering approximately the next 20% of the media map 112, followed by a portion of white covering the next 25% of the media map 112, and a final portion of gray covers approximately the final 5% of the media map 112. In this example, gray is being used to indicate which portions of the clip have been captured and white indicates uncaptured portions. In this example, approximately fifty percent of the clip has been captured.

In the illustrated example, three portions of the clip have been captured: approximately the first twenty-five percent, the portion between fifty and seventy percent, and the final five percent. The captured portions are indicated by the gray color of the media map 112, although additional embodiments are envisioned wherein multiple colors are used to indicate various levels of resolution at which the portion has been captured. For example, a bright red color could indicate that the portion has been captured at full resolution, while a lighter shade of red or another color would indicate that the portion had been captured, but at less than full resolution. Any type of visual indicator could be used, such as colors, gradients or patterns. This is the storage state of the video data. A "storage state" of a portion of video data may indicate (1) whether the portion has been captured, (2) the computer system on which the portion was captured, (3) the resolution at which the portion was captured, (4) how many distinct times the portion of video was captured, and any other characteristic or property of the video data.

In the illustrated example, if the clip were to be erased from the random access device, then the uncaptured portions of the selected clip, represented by white in the media map 112, would be lost, because they have not been captured to long-term storage such as a hard drive. As described above, random access devices are primarily used for temporary storage of video data, erased, and used again. In the illustrated example, it may be assumed that a user has captured the necessary amount of footage to produce the desired final video product, and the user now wishes to delete the random access device; however, the entire clip has not been captured. If a need arises in the future for the uncaptured portions, there is no way to recover the deleted video data. Therefore, a user will often desire to capture, in full resolution to long-term storage, the remaining uncaptured video data prior to erasing and reusing the random access device. The user does not want to waste time capturing data that has already been captured; therefore, a user may utilize the visual indicators offered by a media map to capture only uncaptured footage prior to erasing the random access device. Further, the user may wish to capture at full resolution all footage that has not previously been captured at full resolution, even though portions of the video data have been captured at a lower resolution.

According to an embodiment, to capture the uncaptured video data indicated in FIG. 1, a user moves the playhead 110 to the beginning of the first uncaptured portion of video data, represented by a visual indicator of the media map. In FIG. 1, a user would drag the playhead 110 to the beginning to the first white portion of the media map 112. According to an embodiment, a user receives feedback when the playhead 110 reaches a demarcation point on the media map 112 between a captured and uncaptured portion, in order to accurately place the playhead 110 at the first frame of the portion. For example, the playhead 110 may "snap" to the first frame delineating the border of a captured and uncaptured clip when the playhead 110 is dragged proximate to the border. The user then sets this point as the first frame to be captured, and moves the playhead 110 to the end of the uncaptured portion. When the playhead 110 reaches the border between the uncaptured and captured portion, the playhead "snaps" to the last uncaptured frame. The user then sets that point as the final frame of the portion to be captured. This technique assists the user in capturing only uncaptured frames and none of the frames that have already been captured, and this frame accuracy is an advantage over prior analog approaches which were not frame accurate. Other types of feedback are envisioned, such as sounds or a flashing of portions of the screen.

In this example, the user wishes to capture the uncaptured portions of video data illustrated in FIG. 1. The user moves the playhead 110 to the beginning of the first white portion on the media map 112. According to techniques described earlier, the playhead 110 may "snap" to the first frame of the uncaptured portion, or the user may use another technique to accurately place the playhead 110, such as a timecode. The user sets the frame associated with the position of the playhead 110 as the starting point for capture. The user than moves the playhead 110 to the end of the white portion of the media map 112, perhaps assisted by the feedback described earlier, and sets the frame associated with the position of the playhead 110 as the ending point for capture. Capture is then initiated and the video data between the start and end points is captured in a resolution chosen by the user to long-term storage. According to an embodiment, once the capture has completed, the media map updates to indicate the new capture status of the clip.

Alternate embodiments are envisioned wherein the user sets multiple start and end points for capture, and the media map utilizes visual cues other than color to distinguish between captured and uncaptured footage. According to one embodiment, the entire process of capturing footage may be automated based upon the data comprising a media map. This embodiment could enable the capture of all previously uncaptured data, or could capture data at a different resolution than used for a prior capture. Because the data comprising a media map may define which portions of video data have been captured, among other characteristics, an automated process could utilize the data to eliminate the need for human interaction.

Figure 2:
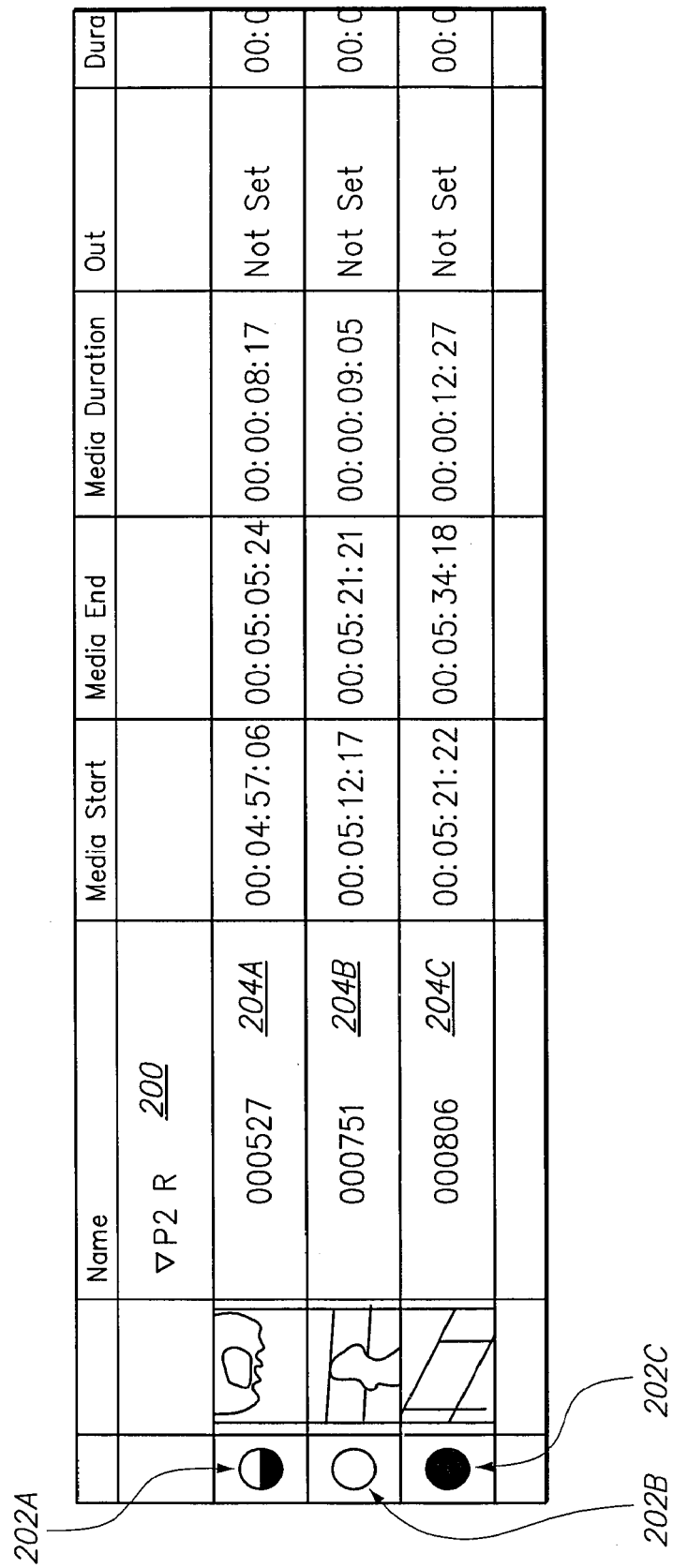
FIG. 2 is a flow diagram illustrating an example of the invention wherein a media map is displayed in a simplified form.

FIG. 2 illustrates an embodiment of the invention where a media map 202a-202c is displayed alongside the associated video clip 204a-204c in a list of files 200.

The file listing 200 of FIG. 2 is similar to that of element 102 of FIG. 1, in that a list of clips 200 stored on a random access device is displayed, along with information about the clips 204a-204c such as a title, duration, start point, end point, and other attributes.

According to an embodiment, a media map 202a-202c is displayed next to the listing of the clip 204a-204c to which the media map is associated. This version of a media map serves to quickly give a user a rough estimate for how much of a clip has been captured. As an example, the media map 202a associated with the first clip 204a listed in FIG. 2 is represented by a circle. The interior of the circle represents the entire clip, and the circle is filled with a visual indication such as a color or pattern, the ration of fill to area indicating visually how much of the clip has been captured. Other elements could be used to represent the clip, such as a square or rectangle.

The media map 202a associated with the first clip 204a listed in FIG. 2 is approximately half filled, thereby representing that approximately half of the clip has been captured. The media map 202b associated with the second clip 204b listed in FIG. 2 is not filled, thereby representing that none of the clip has been captured. The media map 202c associated with the third clip 204c listed in FIG. 2 is fully filled, thereby representing that the entire clip has been captured.

Storing and Accessing Metadata on which Media Maps are Based

Metadata, or data that is used to describe other data, is used extensively in the digital video editing process. Prior approaches use metadata to describe characteristics of video data, and this metadata is stored on the system where the video data was captured, not on the random access device on which the clips were first recorded.

A disadvantage of maintaining the media map data for a clip on a particular computer system is that, in order for a media map to be useful, the media map data must reflect which portions of clips have been captured by any computer system, not just the computer system that has the media map data. Because random access devices are portable, highly versatile and expensive, they are used heavily and on many different systems. Video data may be partially captured on one system, and then taken to another system for further capture. If the metadata for the media map does not travel with the random access device, neither system will have the most current metadata with which to render an accurate media map. Without an accurate indication of which video data has been captured, efforts may be duplicated, or worse, uncaptured footage may be deleted.

Further, many digital video cameras capable of reading and utilizing random access devices are capable of deleting video clips from a random access device, but incapable of altering metadata stored on the random access device. This can result in confusion; for example, a user captures video data from a clip stored on a random access device. As a result, the metadata on the random access device is changed to reflect the new capture status. The random access device is placed back in a camera and all the clips are deleted, but the camera is incapable of changing the metadata on the random access device. Therefore, when the random access device is placed in an editing system, media maps may be rendered for video clips that no longer exist on the random access device.

According to an embodiment of the invention, a file containing metadata describing characteristics of a video clip is stored on the random access device on which the clip has been recorded or is stored. There may be one file containing metadata for each clip, or one file containing metadata for all clips. The data is written to a portion of the random access device specifically set aside for client programs to write data. In one embodiment, this metadata is written to a custom folder in this area and stored in XML format.

Each video clip has a unique identifying code, and this code is stored in the file comprising the video clip and in metadata to link the clip with the metadata describing that clip. According to an embodiment, the unique identifying code is a UID. A UID, or "Unique Identifier", is a globally unique number used in a compound identifier to uniquely identify an object, file type, or other item. An algorithm is used to provide a unique string, which may be hex-based or alphanumeric in nature, and the string may be 32-bit, 40-bit, or even greater in length. This UID is associated with the video clip and information is stored that reflects this association.

Therefore, video editing systems capable of reading this metadata when a random access device is inserted read the unique identifier from the metadata, compare the unique identifier to the clips stored on the random access device, and update the display of the media maps accordingly. If a clip for which a media map was previously stored no longer exists on the random access device, the metadata associated with the deleted clip is modified to reflect the deletion, and the resultant media map for the deleted clip is no longer available. If a clip exists for which no media map is stored on the system, the metadata is read and a media map displayed. Clips which exist on both the system and the random access device have their media maps edited to reflect the current capture status as reflected by the metadata on the random access device.

In order to render a media map from the metadata, information about the starting and ending timecode of each prior capture point is stored, along with the resolution at which the portion of video data was captured. By calculating the starting and ending timecodes of each captured segment, a media map may be rendered in real time. According to an embodiment, the media map based on the metadata may itself be stored as metadata. Storing the media map as metadata allows a media map for a video clip to be stored locally on a hard drive, or stored on a server and accessed by multiple clients. The stored media map may also be included in a project file for reference by a user. This allows a user to see the media map for a video clip without having to insert the random access device on which is stored the video clip referenced by the project file.

Any property, attribute or characteristic of a video clip may be stored in this metadata. Properties of video clips that may be described by this metadata include duration of each captured segment, the current playhead location, and the current start and end of selected capture points. With this information, a user could access a clip in the editing system, set in and out points for capture, close that clip, load another clip and set in and out points for capture, and come back to the first clip. Because the in and out clips for the first opened clip were stored in metadata, they will appear where the user left them.

Using Metadata for Media Organization

Prior approaches to organizing video media, such as tapes, and assisting the process of locating a tape containing footage that needs to be recaptured involved putting stickers on the tapes with names or codes identifying the tape. Editing systems, based on user input, associated the tape name with the footage. A user desiring to recapture footage from a project file would be prompted to insert the tape with the name "X," where "X" stands for the name originally given to the tape. A disadvantage to this approach is that labels fall off and tapes may be erased and new labels not created. Further, there is no way to automatically check that a tape being inserted in the editing system is actually the correct tape.

As discussed previously, video clips stored on random access devices have a unique serial number accessible programmatically. According to an embodiment, a reference to this unique serial number is stored on the random access device in the metadata associated with each clip, and may also be stored on a storage device other than the random access device, such as the user's hard drive. It may also be associated with a project file referencing the video clip.

According to an embodiment, when a request to capture video data in a video clip is received by a computer system, the system compares the UID for the video clip to the UIDs for all video clips stored on any random access device accessible to the system. If the correct UID, and therefore correct video clip, is found on any of those random access devices, then the system automatically captures the requested video data from the clip with the matching UID stored on the random access device. This allows for an automatic confirmation that the video data to be captured is the video data being requested.

According to an embodiment, if no random access device containing the correct video clip is available, the system prompts the user to insert the random access device. While the prompt may take the form of requesting the user to insert the random access device containing a video clip with a particular UID, this is not user-friendly because the UID may comprise a long hexadecimal or alphanumeric string. According to an embodiment, one approach to providing a user-friendly prompt is for a user, in response to a prompt generated by the system, to name the random access device when video data stored on the device is captured. This name may be stored in metadata on the device and on a storage device other than the random access device, such as the user's hard drive. It may also be associated with a project file referencing the video clip.

Therefore, if no random access device containing the correct video clip is available in response to a request to capture video data from the clip, the system prompts the user to insert the correct random access device with the provided user-friendly name. When a random access device is inserted, the UIDs of the video clips stored thereon are checked as described above.

Edit-in-Place

One approach to editing video footage without capturing the video data to long-term storage is called edit-in-place. Edit-in-place is a convenient way, used by many news organizations, to create a digital video file. Edit-in-place is best suited for choosing small portions of video data stored on a random access device, overlaying logos or similar graphics onto the footage, and exporting to a digital format. Edit-in-place is not well-suited for multilayer and multistream editing.

According to an embodiment, a QuickTime container is created in memory of the editing system that points to the video data on the random access device. Video data may be read directly through the container when needed; therefore, there is no need to copy the data. A user selects a clip, sets start and end capture points, and issues a command to edit-in-place. A clip is created in memory that points to video data on the random access device.

According to an embodiment, the execution of this process, and the data associated with edit-in-place, such as the start and end capture points, may be stored in metadata as described above. Therefore, a media map of the video clip may include a visual indicator that certain portions of the clip have been edited-in-place. Edit-in-place may be indicated with a color or pattern as described earlier.

Extensions & Alternatives

While example of these techniques have been given in the context of random access devices where video data is captured to long-term storage, the techniques may be employed in any number of additional contexts. For example, the download of streaming video or files being downloaded over a network. According to an embodiment, a server from which files are being downloaded may maintain metadata describing the transfer state of the files. This metadata may be updated during and after the transfer to reflect the current state of the transfer. The metadata may be used to display a visual representation of the transfer and/or transfer state.

Hardware Overview

Figure 3:
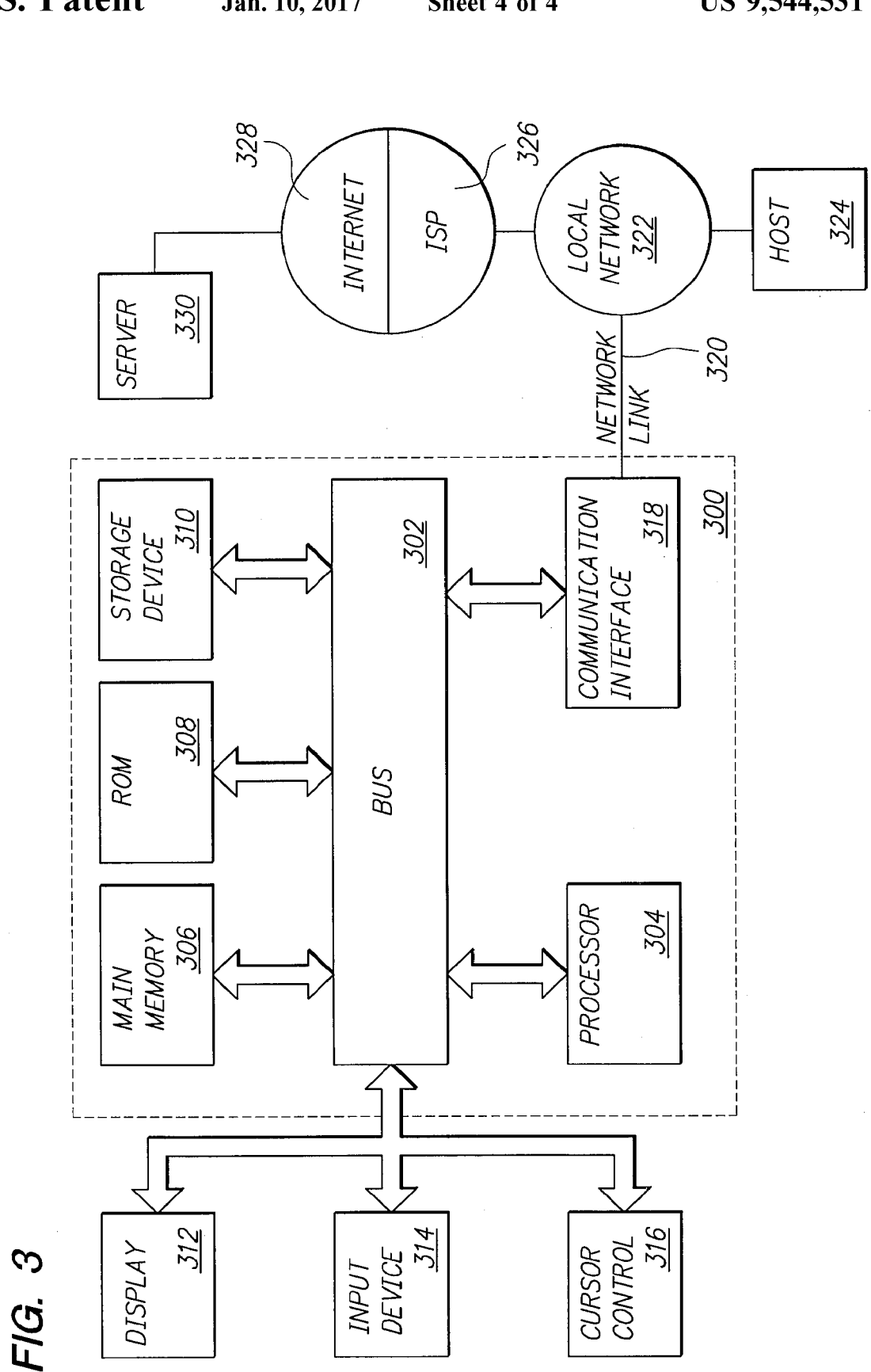
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
receiving, at a client device, a media map data configured to identify a portion of a digital media item that has been backed up at full resolution in an external network location;
presenting, on the client device, the digital media item simultaneously with a scrub bar, the scrub bar being configured to present, on a slider, a duration of the digital media item and a current playback position; and
superimposing, on the client device, a media map on the scrub bar to visually identify the portion of the digital media item that is backed up at full resolution in the external network location on the scrub bar, wherein the media map is generated according to the media map data.

2. The method of claim 1, wherein the digital media item presented is a low resolution version of the digital media item.

3. The method of claim 1, wherein the media map data includes information indicating a start point and an end point for the backed up portion of digital media item.

4. The method of claim 1, wherein the backed up portion of the digital media item is visually identified by applying a color to a corresponding section of the slider.

5. The method of claim 4, wherein the color varies according to a resolution of the backed up portion of the digital media item.

6. The method of claim 1, further comprising:
receiving an instruction to back up another portion of the digital media item, the instruction including an operation to adjust the current playback position of the digital media item;
determining that the current playback position is near a frame of the digital media item that is between the portion that is backed up at full resolution to the external network location and a non-backed up portion; and
repositioning the current playback position to the frame.

7. At least one non-transitory computer-readable storage medium storing one or more sequences of instructions which, when executed by one or more processors, causes the one or more processors to perform the operations of:
receiving, in a device, a media map data configured to identify a portion of a digital media item that has been backed up at full resolution in an external network location;
presenting, on the device, the digital media item simultaneously with a scrub bar, the scrub bar being configured to present, on a slider, a duration of the digital media item and a current playback position; and
superimposing, on the device, a media map on the scrub bar to visually identify the portion of the digital media item that is backed up at full resolution in the external network location on the scrub bar, wherein the media map is generated according to the media map data.

8. The at least one non-transitory computer-readable storage medium of claim 7, wherein the digital media item presented is a low resolution version of the digital media item.

9. The at least one non-transitory computer-readable storage medium of claim 7, wherein the media map data includes information indicating a start point and an end point for the portion of the digital media item that is backed up at full resolution in the external network location.

10. The at least one non-transitory computer-readable storage medium of claim 7, wherein the media map includes information indicating a resolution of the backed up portion of digital media item.

11. The at least one non-transitory computer-readable storage medium of claim 7, wherein the backed up portion of the digital media item is visually identified by applying a color to a corresponding section of the slider.

12. The at least one non-transitory computer-readable storage medium of claim 11, wherein the color varies according to a resolution of the backed up portion of the digital media item.

13. The non-transitory computer-readable storage medium of claim 7, further comprising:
receiving an instruction to back up another portion of the digital media item, the instruction including an operation to adjust the current playback position of the digital media item;
determining that the current playback position is near a frame of the digital media item that is between a portion that is backed up at full resolution to the external network location and a non-backed up portion; and
repositioning the current playback position to the frame.

14. A system comprising:
at least one processor;
a communication interface for connecting to one or more external network locations;
at least one memory storing instructions for controlling the processor to perform steps comprising:
receiving a media map data configured to identify a portion of a digital media item that has been backed up at full resolution in an external network location;
presenting the digital media item simultaneously with a scrub bar, the scrub bar being configured to present, on a slider, a duration of the digital media item and a current playback position; and
superimposing a media map on the scrub bar to visually identify the backed up portion of the digital media item at full resolution in an external network location on the scrub bar, wherein the media map is generated according to the media map data.

15. The system of claim 14, wherein the backed up portion of the digital media item is visually identified by applying a color to a corresponding section of the slider.

16. The system of claim 15, wherein the color varies according to a resolution of the backed up portion of the digital media item.

17. The system of claim 14, wherein the steps further comprise:
   receiving an instruction to back up another portion of the digital media item, the instruction including an operation to adjust the current playback position of the digital media item;
   determining that the current playback position is near a frame of the digital media item that is between a portion that is backed up at full resolution to the external network location and a non-backed up portion; and
   repositioning the current playback position to the frame.

* * * * *